(12) United States Patent
Le Sage et al.

(10) Patent No.: US 8,730,811 B2
(45) Date of Patent: May 20, 2014

(54) MANAGING NETWORK TRAFFIC

(75) Inventors: Jocelyn Le Sage, St-Colomban (CA); Stephane Laroche, Montreal (CA); Richard H. Blanchette, Hopkinton, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 379 days.

(21) Appl. No.: 13/081,766

(22) Filed: Apr. 7, 2011

(65) Prior Publication Data

US 2012/0257502 A1 Oct. 11, 2012

(51) Int. Cl.
*H04W 28/08* (2009.01)
(52) U.S. Cl.
USPC ......................................... 370/235
(58) Field of Classification Search
USPC ......... 370/392, 338, 235, 225, 230, 389, 229, 370/412; 709/217, 226; 455/414.1; 713/171, 153
See application file for complete search history.

(56) References Cited

U.S. PATENT DOCUMENTS

| | | | | |
|---|---|---|---|---|
| 7,248,858 B2 * | 7/2007 | Barber et al. | ............... | 455/414.1 |
| 7,343,485 B1 * | 3/2008 | Huang et al. | ................... | 713/153 |
| 7,469,295 B1 * | 12/2008 | Gangadharan | ................. | 709/232 |
| 8,004,971 B1 * | 8/2011 | Szabo et al. | ................... | 370/230 |
| 8,031,709 B2 * | 10/2011 | Alexander, Jr. | ............... | 370/389 |
| 8,130,641 B2 * | 3/2012 | Wong et al. | ................... | 370/229 |
| 8,248,928 B1 * | 8/2012 | Wang et al. | ..................... | 370/230 |
| 2001/0053150 A1 * | 12/2001 | Clear et al. | ..................... | 370/392 |
| 2003/0037169 A1 * | 2/2003 | Kitchin | ......................... | 709/249 |
| 2003/0210671 A1 * | 11/2003 | Eglin | ............................ | 370/338 |
| 2004/0103282 A1 * | 5/2004 | Meier et al. | ..................... | 713/171 |
| 2005/0053046 A1 * | 3/2005 | Wang | ............................ | 370/338 |
| 2005/0174943 A1 * | 8/2005 | Wang | ............................ | 370/235 |
| 2006/0114839 A1 * | 6/2006 | Meier et al. | ..................... | 370/254 |
| 2008/0285441 A1 * | 11/2008 | Abdulla et al. | ............... | 370/225 |
| 2010/0183011 A1 * | 7/2010 | Chao | ............................ | 370/392 |
| 2010/0214913 A1 * | 8/2010 | Kompella | ..................... | 370/230 |
| 2010/0299437 A1 * | 11/2010 | Moore | ......................... | 709/226 |
| 2010/0332615 A1 * | 12/2010 | Short et al. | ..................... | 709/217 |
| 2012/0207175 A1 * | 8/2012 | Raman et al. | ................. | 370/412 |

* cited by examiner

*Primary Examiner* — Asad Nawaz
*Assistant Examiner* — Parth Patel (57) ABSTRACT

Managing network traffic includes associating a wireless client device with a wireless access point comprising at least one processor with said wireless access point, identifying a network to which said wireless client device is assigned; and with said wireless access point, assigning said wireless client device to one of a plurality of Virtual Local Area Networks (VLANs) implemented within said network according to a protocol for balancing network traffic across the plurality of VLANs.

17 Claims, 7 Drawing Sheets

MANAGING NETWORK TRAFFIC

BACKGROUND

The infrastructure of a typical computer network may include a collection of interconnected network devices, including routers and switches. For example, a network may be set up to include multiple edge routers forming the logical outer boundaries of the network and multiple core switches and routers for forwarding packets between devices within the logical outer boundaries of the network. These interconnected network devices may form multiple redundant physical paths between any two points on the network. By distributing traffic between the two points across these redundant paths, network robustness increases, and the burden of managing packet flow is distributed across multiple devices.

One method of exploiting redundant physical paths in a network is through the use of Virtual Local Area Networks (VLANs). By creating multiple VLANs in the same physical domain, the infrastructure of a network may implement multiple logically separate broadcast domains. The separate broadcast domains associated with the different VLANs may use different intermediary routers or switches to route network traffic between the same two points. By assigning different client devices to different VLANs, traffic to and from popular points on the network may be more evenly distributed across the infrastructure devices of the network. Such a configuration typically requires a network administrator to manually assign specific network access points and/or groups of users to specific VLANs, which can be a time-consuming task and increase the complexity of network management.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

The present specification discloses systems, methods, and computer program products for managing network traffic by automatically distributing wireless client devices across multiple VLANs during authentication with a wireless access point. According to the principles described herein, traffic for a network may be distributed evenly across network infrastructure devices, thereby increasing the robustness and traffic capacity of the network without requiring an administrator to manually assign each client device to a separate VLAN.

For example, the present specification discloses an illustrative method of managing network traffic from wireless client devices. This method includes: associating a wireless client device with a wireless access point comprising at least one processor with the wireless access point, identifying a network to which wireless client device is assigned; and with the wireless access point, assigning the wireless client device to one of a plurality of Virtual Local Area Networks (VLANs) implemented within the network according to a protocol for balancing network traffic across the plurality of VLANs.

The present specification further discloses a method of managing network traffic in a system of interconnected wireless access points, including: associating a wireless client device with a first wireless access point comprising at least one processor; with the first wireless access point, identifying a network to which wireless client device is assigned; with the first wireless access point, assigning the wireless client device to one of a plurality of Virtual Local Area Networks (VLANs) implemented within the network according to a protocol for balancing network traffic across the plurality of VLANS; in response to the wireless client device disconnecting from the first wireless access point, associating the wireless client device with a second wireless access point; and with the second wireless access point, assigning the wireless client device to the same VLAN to which the first wireless access point assigned the wireless client device.

The present specification also discloses a wireless access point having a processor communicatively coupled to a memory. The memory stores executable code which, when executed by the processor, causes the processor to: connect to a wireless client device assigned to a network; determine whether the wireless client device has been assigned to one of a plurality of Virtual Local Area Networks (VLANs) implemented within the network by a previous wireless access point in the network; if the wireless client device device has not been assigned to one of the plurality of VLANs by a previous wireless access point, assigning the wireless client device to one of the VLANs according to a protocol for balancing network traffic across the plurality of VLANs; and if the wireless client device has been assigned to one of the plurality of VLANS by a previous wireless access point, assigning the wireless client device to the VLAN to which the wireless client device was previously assigned.

As used in the present specification and in the appended claims, the term "wireless access point" refers to a device which allows wireless devices to connect to a wired router using Wi-Fi, Bluetooth, or any other relevant wireless standard.

As used in the present specification and in the appended claims, the term "wireless client device" refers to an electronic device which connects to a wired router using a wireless access point.

As used in the present specification and in the appended claims, the terms "Virtual Local Area Network" and "VLAN" refer to any subdivision of a network in which packets transmitted on the subdivision are not accessible to or viewable by any other subdivision of the network. A VLAN as defined herein may be specified VLAN IDs according to Ethernet packet protocol. However, a VLAN as defined herein may also be implemented in a manner that is completely independent of the existence or content of any VLAN ID specified according to Ethernet packet protocol.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an example" or similar language means that a particular feature, structure, or characteristic described in connection with the example is included in at least that one example, but not necessarily in other examples. The various instances of the phrase "in one example" or similar phrases in various places in the specification are not necessarily all referring to the same example.

Figure 1:
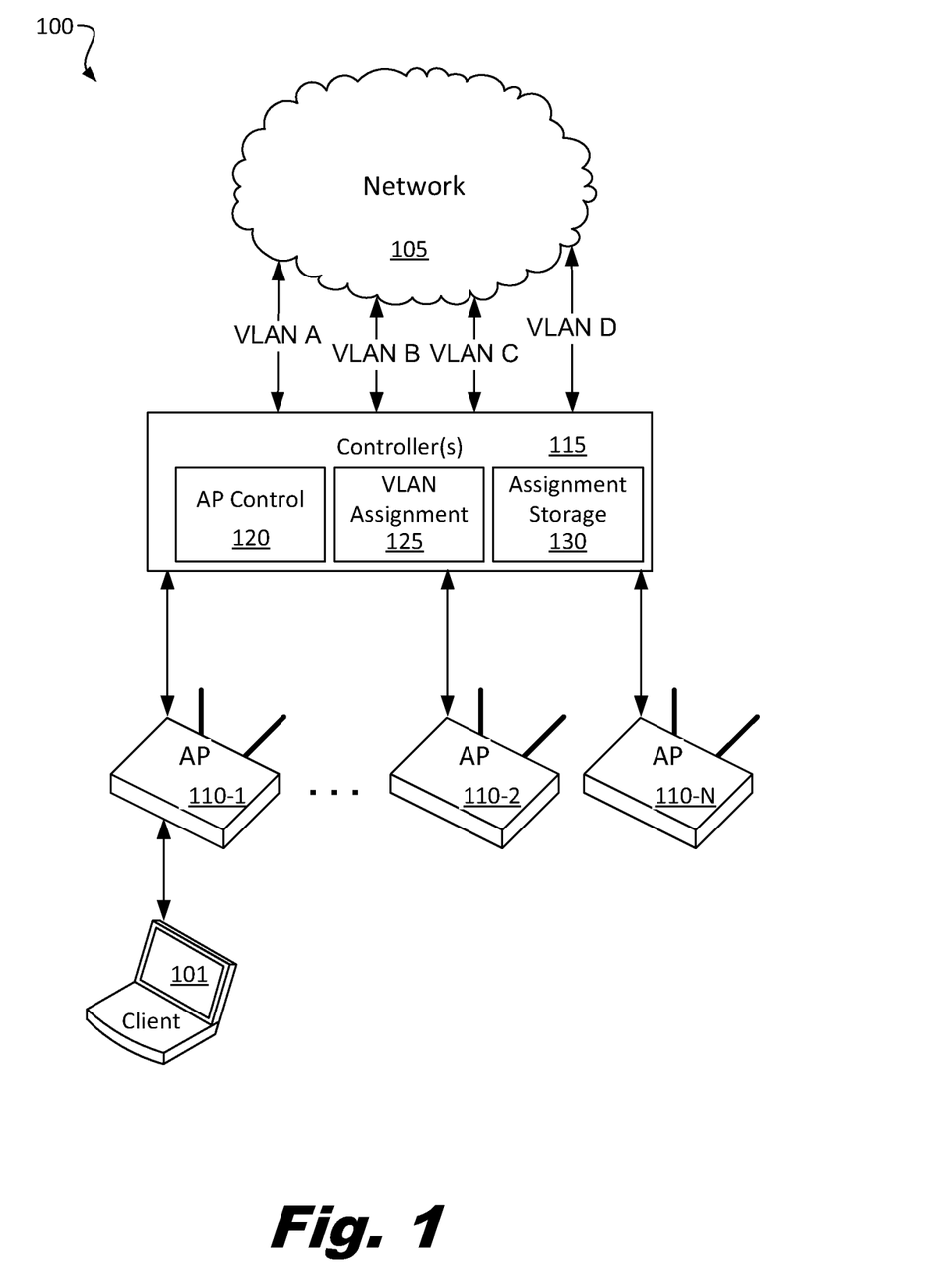
FIG. 1 is a diagram of an illustrative system for connecting a client device to a network, according to one example of principles described herein.

FIG. 1 shows a diagram of an illustrative system (100) for connecting a client device (101) to a network (105), according to one example of principles described herein. The client device (101) accesses the network (105) through an access point (110-1). The access point (110-1) is part of a group of access points (110-1 to 110-N) which are managed by at least one controller device (115). In the example of FIG. 1, the client device (101) is a computer and the access point (110-1) is a wireless access point that communicates with the client device (101) according to IEEE 802.11 or any other applicable wireless networking standard.

The controller device (115) performs various functions within the system (100). Some of these functions are illustrated in FIG. 1 as modules (120, 125, 130) implemented by the controller device (115). These modules include an access point control module (120), a VLAN assignment module (125), and an assignment storage module (130).

The access point control module (120) connects to and configures each of the access points (110-1 to 110-N) managed by the controller (115). For example, the access point control module (120) may configure each of the access points (110-1 to 110-N) to comply with network policy. Additionally, the access point control module (120) provides an interface between each access point (110-1 to 110-N) and the network (105).

The physical domain of the network (105) of the present example implements a plurality of different Virtual Local Area Networks (VLANs). Each VLAN implements a broadcast domain that is logically separate from the other VLANs. The separate broadcast domains associated with the different VLANs may use different intermediary routers or switches to route network traffic between the same two points. Thus, by assigning different client devices (101) to different VLANs, traffic to and from popular points on the network may be more evenly distributed across the infrastructure devices of the network. Once a client device (101) has been assigned to a VLAN implemented by the network (105), all traffic between the client device (101) and the network (105) will be forwarded over the assigned VLAN.

In certain examples, traffic between the client device and the network (105) may not be forwarded on the assigned VLAN directly at the access point (110-1 to 110-N). For example, traffic from a client device to the network (105) may be forwarded to another device using a tunneling protocol before actually reaching the assigned VLAN of the network (105).

In the system of FIG. 1, each client device (101) that connects to an access point (110-1 to 110-N) for access to the network (105) is automatically assigned to a different VLAN implemented by the network (105). In the present example, the VLAN assignment module (125) may algorithmically determine the VLAN to which each client device (101) is assigned. In alternate examples, the assignment of each client device (101) to a specific VLAN implemented by the network (105) may be handled by the separate access points (110-1 to 110-N).

The assignment of a client device (101) to a specific VLAN implemented by the network (105) may be based on a protocol for balancing network traffic across each of the VLANs. The protocol for balancing network traffic across each of the VLANs may define a process for distributing client devices (101) to different VLANs in a way that network traffic is substantially distributed across the VLANs. For instance, in some examples the client devices (101) may be assigned to the VLANs in a circular round-robin fashion. In other examples, a hashing function may be performed on a physical address of each client device (101) to determine the VLAN to which that client device (101) will be assigned. In still other examples, each client device may be assigned to a particular VLAN based on measured, estimated, or anticipated network traffic over the different VLANs.

In many cases, a client device (101) may be mobile, moving from one access point (110-1) to another. This may particularly be the case where the client device (101) is a portable device that communicates with the access point(s) (110-1 to 110-N) over wireless channels. When a client device (101) disconnects from one of the access points (110-1 to 110-N) and reconnects to the same access point or to another of the access points (110-1 to 110-N), the system (100) shown in the example of FIG. 1 may ensure that the client device (101) is reassigned to the same VLAN to which it was previously assigned. This functionality may help ensure a reasonable degree of continuity in network communications to and from a client device (101) prior to, during, and after access point transitions To ensure that a client device (101) that has disconnected from an access point (110-1 to 110-N) will be reassigned to the same VLAN to which it was previously assigned, a repository of VLAN assignments may be maintained. The repository may store an indication of each VLAN assignment made for each client device (101) that has been made by the system (100). In some examples, such a repository may be an external database with which each of the access points (110-1 to 110-N) may interact. Additionally or alternatively, the client device assignments may be synchronized across the controllers, stored locally by the access points (110-1 to 110-N), and/or synchronized across the access points (110-1 to 110-N).

In the example of FIG. 1, this repository of client device assignments is shown as a module (130) of the controller(s) (115). This repository is accessible to each of the access points (110-1 to 110-N). In this way, when a client device (101) transitions from a first access point (110-1 to 110-N) to a second access point (110-1 to 110-N), the second access point may access the repository of VLAN assignments to determine whether the client device (101) has already been assigned to a VLAN. If such a previous assignment is found, the second access point (110-1 to 110-N) may retrieve an indication of the VLAN to which the client device (101) was previously assigned and reassign the client device (101) to the same VLAN.

In examples where an initial assignment of a client device (101) to a VLAN is made by performing a hashing function on persistent data associated with the client device (101) (e.g., a MAC address), such a repository may not be necessary if the hashing function results in the same VLAN assignment each time the hashing function is applied to the persistent data associated with the client device (101). In such cases, each access point (110-1 to 110-N) may simply perform the hashing function on the persistent data associated with any newly connected client device (101) and assign the client device (101) to the VLAN indicated by the hashing function. This approach will result in a client device (101) transitioning from a first access point (110-1 to 110-N) to a second access point (110-N) to maintain its VLAN assignment without requiring the second access point (110-1 to 110-N) to be aware of any previous assignment made to that client device (101).

Figure 2:
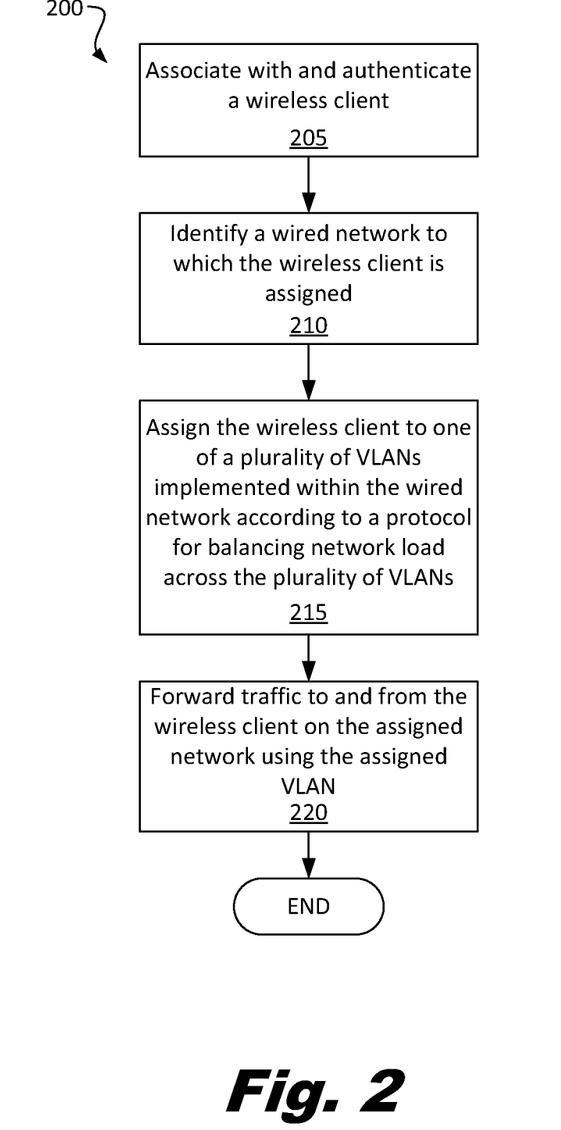
FIG. 2 is a flow diagram of an illustrative method of managing network traffic, according to one example of principles described herein.

FIG. 2 shows a flow diagram of an illustrative method (200) of managing network traffic according to one example of principles described herein. For example, the method (200) may be performed by a wireless access point (110-1) in a system similar to the system (100) of FIG. 1. In the method (200), an access point associates with and authenticates (block 205) a wireless client device (101). Once the client device (101) has been authenticated, the access point (110-1) identifies (block 210) a wired network (105) to which the wireless client device (101) is assigned. In certain systems, each client device (101) will be assigned to the same wired network (105). For example, in the system (100) of FIG. 1, the controller(s) (115) only interface with one network (105), and therefore each wireless client device (101) will be assigned to that wired network (105) by default. Additionally or alternatively, the client device (101) may be assigned to a wired network based on the identity of the client device, the wireless access point associated with the client device, a user of the client device, and/or any other criterion that may suit a particular application of the principles described herein.

The wired network (105) to which the wireless client device (101) is assigned implements multiple VLANs. The access point (110-1) assigns (block 215) the wireless client device to one of the VLANs implemented by the wired network (105) according to a protocol for balancing network traffic across the VLANs. This protocol may cause the access point(s) (110-1 to 110-N) of the system (100) to programmatically distribute network traffic in a balanced manner across the VLANs. If the wireless client device (101) has already been assigned to a VLAN of the network (105) by a previous access point (110-1 to 110-N), the wireless client device (101) will be reassigned to the same VLAN. Once the wireless client device (101) has been assigned to a VLAN, network traffic between the wireless client device (101) and the network (105) will be forwarded (block 220) over the assigned VLAN.

Figure 3:
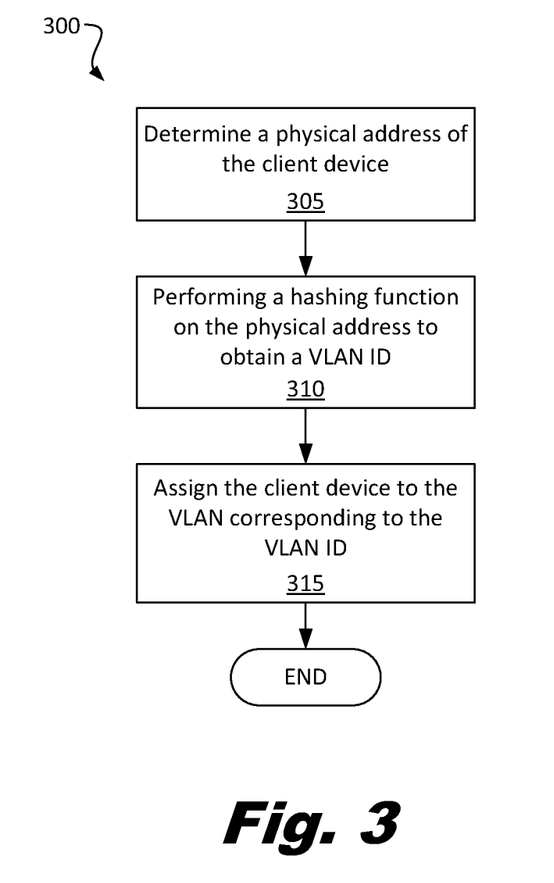
FIG. 3 is a flow diagram of an illustrative method of balancing network traffic across the plurality of VLANs, according to one example of principles described herein.

FIG. 3 is a flow diagram of an illustrative method (300) of assigning a client device to a VLAN according to a protocol for balancing network traffic across multiple VLANs implemented by a network. According to this method (300), a physical address of the client device is determined (block 305). The physical address may be, for example, a Media Access Control (MAC) address of the client device. A hashing function is then performed (block 310) on the physical address to obtain the identification of one of the VLANs implemented by the network. The client device is then assigned (block 315) to the VLAN identified by the result of the hashing function.

The hashing function may be designed such that any physical address input will result in a selection of one of the VLANs implemented by the network, with client devices being assigned to VLANs in a random or pseudo-random manner. For example, a VLAN may be assigned to the client device by hashing the MAC address of the client device and performing a modulo operation on the hash result, where the modulus is the number of VLANs. Thus, the following represents one example formula for assigning a client device to a VLAN implemented by the network:

Assigned VLAN ID=hash(MAC address)%(<First ID of VLAN range>+<Number of IDs in VLAN range>+1)

Any suitable hashing function or algorithm may be implemented. Examples of suitable hashing functions that may be used to assign a client device to one of a finite number of VLANs include, but are not limited to: SuperFastHash, FNV (also known as Fowler/Noll/Vo), Bob Jenkins, and the like. In this way, network traffic may be substantially evenly distributed across the finite number of VLANs implemented within the network.

Figure 4:
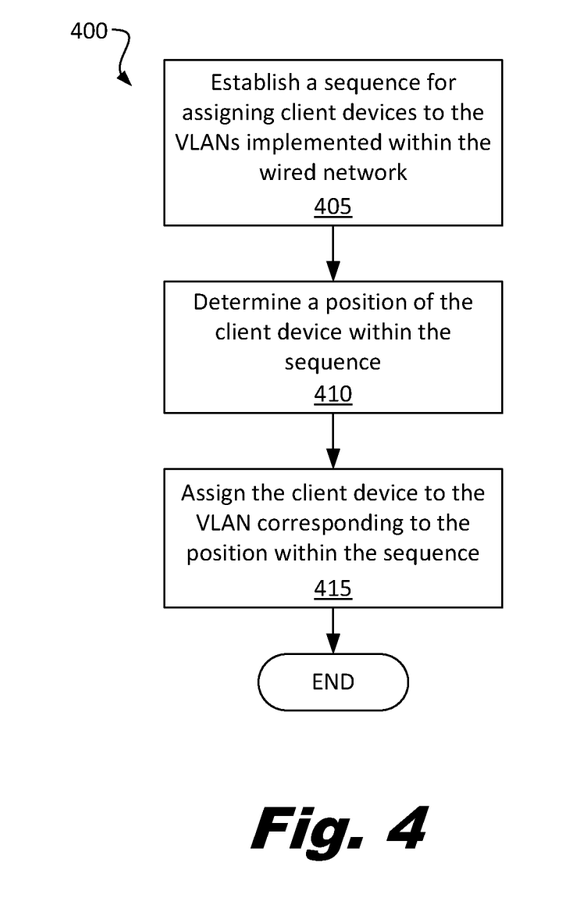
FIG. 4 is a flow diagram of an illustrative method of balancing network traffic across the plurality of VLANs, according to one example of principles described herein.

FIG. 4 is a flow diagram of another illustrative method (400) of assigning a client device to a VLAN according to a protocol for balancing network traffic across multiple VLANs. In this method (400), a sequence for assigning client devices to the VLANs is established (block 405). For example, a circular round-robin sequence may be established such that consecutive new client devices are evenly distributed among the VLANs. Alternatively, other types of sequences may be established. For example, in a network implementing four VLANs, where the first VLAN has more available network resources then the other VLANs, the following repeating sequence for assigning client devices to the VLANs may be established: {VLAN-A, VLAN-B, VLAN-A, VLAN-C, VLAN A, VLAN-B, VLAN-A, VLAN-C, ... }. The sequence for assigning client devices to the VLANs may be established before any client connects to an access point. Additionally or alternatively, the sequence may be dynamically altered by an access point controller or an access point based on measured, estimated, and/or anticipated network traffic among the VLANs.

When a client device connects to an access point, a position of the client device within the sequence is determined (block 410), and the client device is assigned (block 415) to the VLAN corresponding to that position within the sequence.

Figure 5:
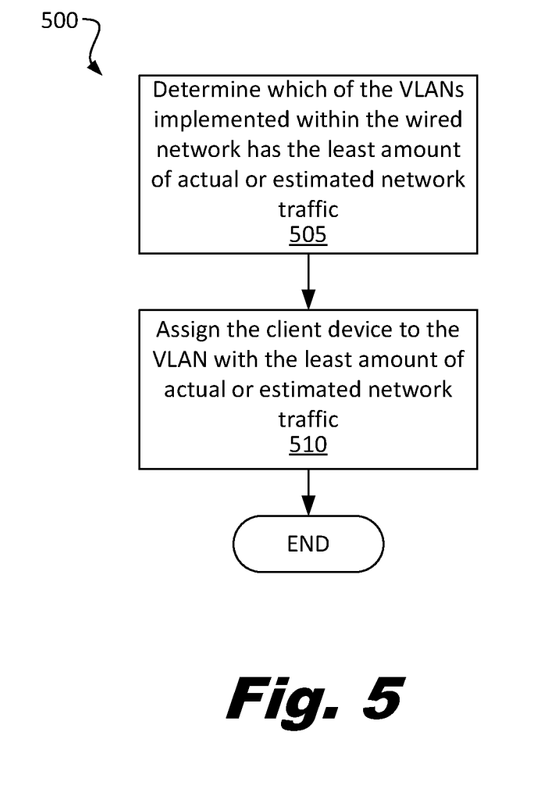
FIG. 5 is a flow diagram of an illustrative method of balancing network traffic across the plurality of VLANs, according to one example of principles described herein.

FIG. 5 is a flow diagram of yet another illustrative method (500) of assigning a client device to a VLAN according to a protocol for balancing network traffic across multiple VLANs implemented by a network. According to the method (500) of FIG. 5, at or before the time a new client device connects to an access point, a determination is made (block 505) as to which of the VLANs implemented by the network has the least amount of actual or estimated network traffic. The newly connected client device is then assigned (510) to the VLAN with the least amount of actual or estimated network traffic.

Figure 6:
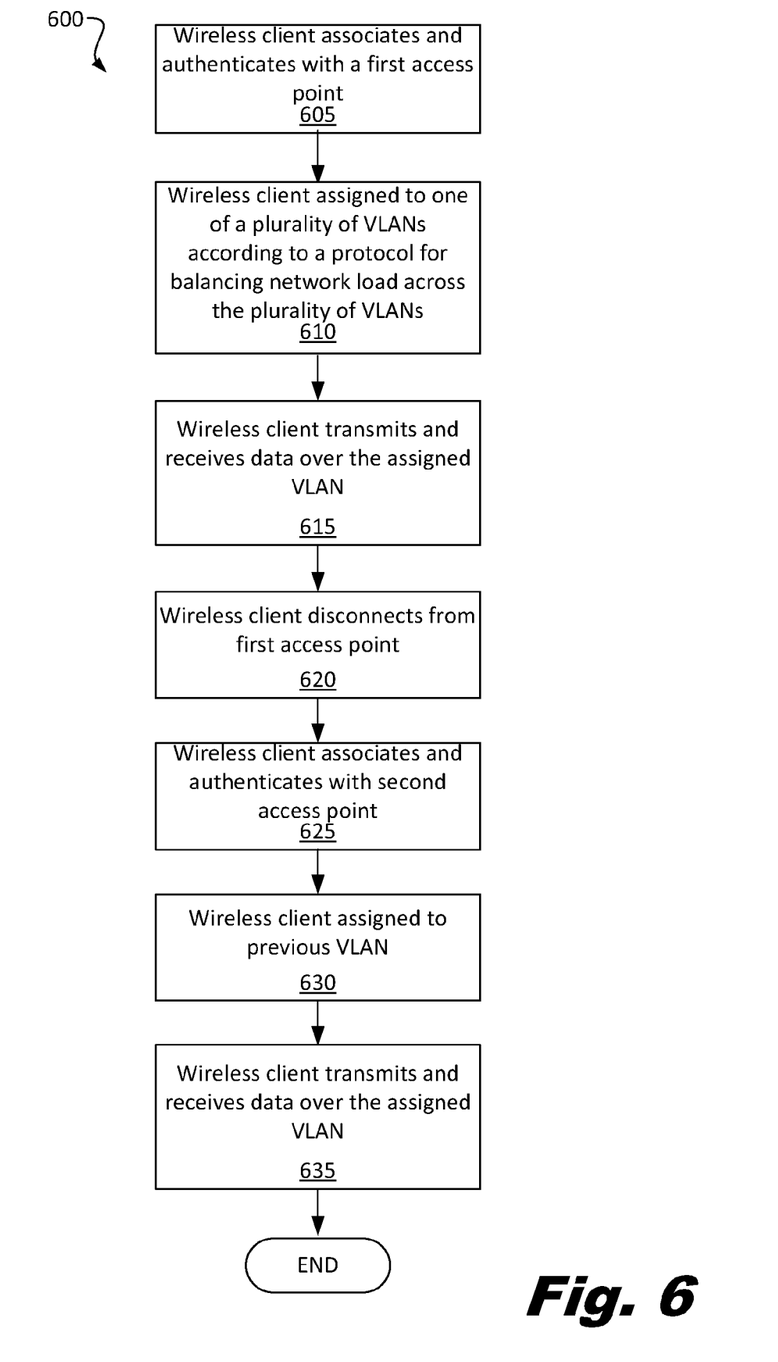
FIG. 6 is a flow diagram of an illustrative method of managing network traffic, according to one example of principles described herein.

FIG. 6 is a flow diagram of an illustrative method (600) of managing network traffic where client devices are able to move from one access point to another, according to one example of principles described herein. In the method of FIG. 6, a client device associates and authenticates (block 605) with a first wireless access point. The client device is then assigned (block 610) to one of a plurality of VLANs implemented by the network, according to a protocol for balancing network load across the VLANs. While connected to the first access point, the client device transmits and receives (block 615) data over the assigned VLAN.

At some point, the client device disconnects (block 620) from the first access point and attempts to connect to the second access point. Upon associating and authenticating (block 625) with the second wireless access point, the client device is assigned (block 630) to the same VLAN to which the client device was assigned when it connected to the first wireless access point.

To accomplish this functionality, the second access point may access a repository of client device assignments stored by a controller device, query other access points for a previous assignation of the client device, query a locally stored copy of a repository of client device assignations in the system, and/or apply a hashing function to persistent data associated with the client device to determine the assignation of the client device. Once the client device has been reassigned to its VLAN, the client device may transmit and receive (block 635) data from the network over the assigned VLAN.

Figure 7:
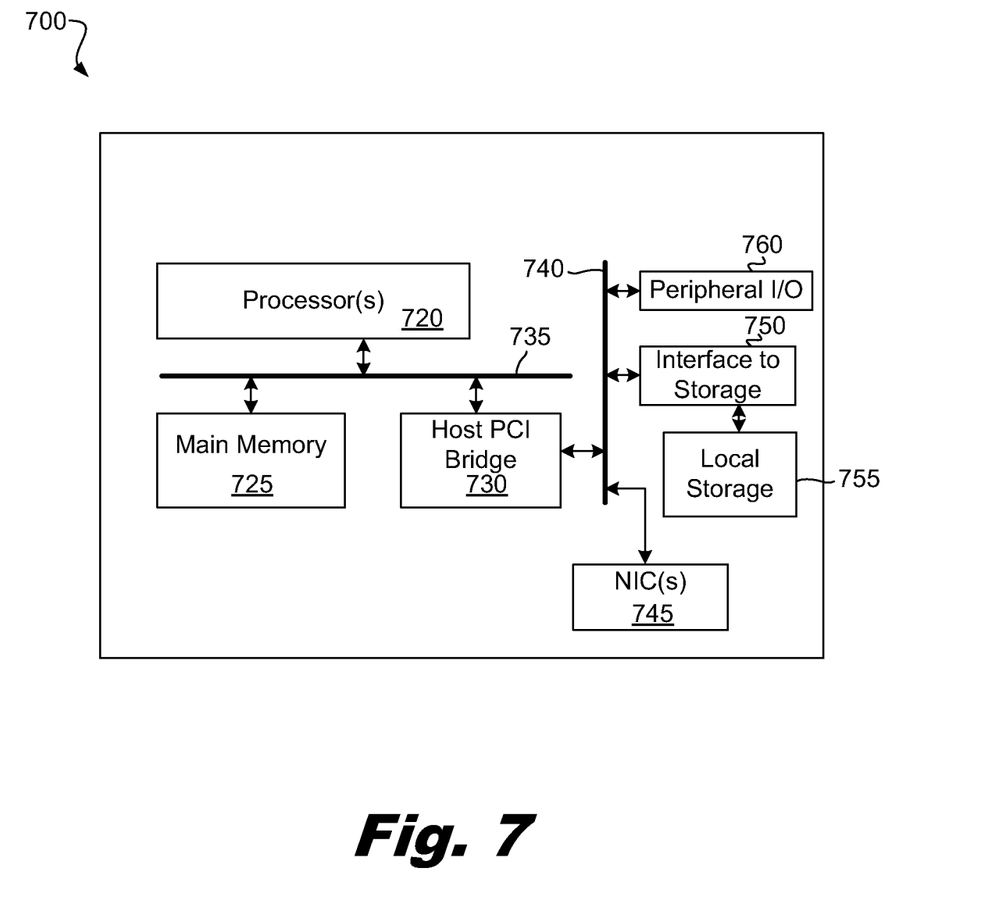
FIG. 7 is a block diagram of an illustrative network device, according to one example of principles described herein.

FIG. 7 is a block diagram of an illustrative network device (705). The illustrative network device (705) may implement an access point, an access point controller, a client device, and/or any other network device to perform the functionality described in relation to the previous Figures.

In this illustrative device (705), an underlying hardware platform executes machine-readable instructions to exhibit a desired functionality. For example, if the illustrative device (705) is configured to implement a wireless access point, the machine-readable instructions may include at least instructions for authenticating a client device, identifying a network assigned to the client device, assigning the client device to one of a plurality of VLANs implemented by the network assigned to the client device, and allowing the client device to transmit and receive data from the network over the assigned VLAN.

The hardware platform of the illustrative device (705) may include at least one processor (720) that executes code stored in the main memory (725). In certain examples, the processor (720) may include at least one multi-core processor having multiple independent central processing units (CPUs), with each CPU having its own L1 cache and all CPUs sharing a common bus interface and L2 cache. Additionally or alternatively, the processor (720) may include at least one single-core processor.

The at least one processor (720) may be communicatively coupled to the main memory (725) of the hardware platform and a host peripheral component interface bridge (PCI) (730) through a main bus (735). The main memory (725) may include dynamic non-volatile memory, such as random access memory (RAM). The main memory (725) may store executable code and data that obtainable by the processor (720) through the main bus (735).

The host PCI bridge (730) may act as an interface between the main bus (735) and a peripheral bus (740) used to communicate with peripheral devices. Among these peripheral devices may be one or more network interface controllers (745) that communicate with one or more networks, an interface (750) for communicating with local storage devices (755), and other peripheral input/output device interfaces (760).

The configuration of the hardware platform of the network device (705) in the present example is merely illustrative of one type of hardware platform that may be used in connection with the principles described in the present specification. Various modifications, additions, and deletions to the hardware platform may be made while still implementing the principles described in the present specification.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method of managing network traffic, comprising:
   associating a wireless client device with a wireless access point comprising at least one processor;
   with said wireless access point, identifying a wired network to which said wireless client device is assigned, wherein said wired network implements a plurality of Virtual Local Area Networks (VLANs);
   determining whether said wireless client device has been assigned to one of said plurality of VLANs implemented within said wired network;
   when said wireless client device has not been assigned to one of said plurality of VLANs with said wireless access point, assigning said wireless client device to one of said plurality of VLANs implemented within said wired network according to a protocol for balancing network traffic across the plurality of VLANs; and
   when said wireless client device has been assigned to said one of said plurality of VLANs, assigning said wireless client device to said one of said VLANs to which said wireless client device was previously assigned;
   in which assigning said wireless client device to said one of said plurality of VLANs implemented within said wired network according to said protocol for balancing network load across said plurality of VLANs comprises:
   determining a physical address associated with said wireless client device; and
   performing a hashing function on said physical address to obtain an identity of said one of said plurality of VLANs;
   in which performing said hashing function on said physical address results in the same VLAN assignment each time said hashing function is applied, such that said wireless client device transitions from a first wireless access point to a second wireless access point without said second access point acquiring any previous assignment information of said wireless client device to said first wireless access point.

2. The method of claim 1, further comprising: forwarding traffic to and from said wireless client device on the assigned wired network using the assigned VLAN.

3. The method of claim 1, in which assigning said wireless client device to said one of said plurality of VLANs implemented within said wired network according to said protocol for balancing network load across said plurality of VLANs comprises:
   establishing a sequence for assigning wireless client devices to said plurality of VLANs implemented within said wired network; and
   assigning said wireless client device to a said VLAN corresponding to a position of said wireless client device within said sequence.

4. The method of claim 3, in which said sequence is a circular round-robin sequence such that consecutive new client devices are evenly distributed among said plurality of VLANs.

5. The method of claim 3, in which a VLAN with more available network resources than other VLANs in the plurality of VLANs appears more frequently in said sequence than other VLANs in the plurality of VLANs.

6. The method of claim 1, in which assigning said wireless client device to said one of said plurality of VLANs implemented within said wired network according to said protocol for balancing network load across said plurality of VLANs comprises:
   determining which VLAN in said plurality of VLANs has the least amount of network traffic; and
   assigning said wireless client device to said VLAN having said least amount of network traffic.

7. The method of claim 1, in which performing said hashing function comprises hashing a media access control address of said wireless client device and performing a modulo operation on a hash result, wherein a modulus of said modulo operation is the number of said plurality of VLANs.

8. A method of managing network traffic in a system of interconnected wireless access points, comprising:
associating a wireless client device with a first wireless access point comprising at least one processor;
with said first wireless access point, identifying a network to which said wireless client device is assigned;
with said first wireless access point, assigning said wireless client device to one of a plurality of Virtual Local Area Networks (VLANs) implemented within said network according to a protocol for balancing network traffic across the plurality of VLANS;
in response to said wireless client device disconnecting from said first wireless access point, associating said wireless client device with a second wireless access point; and
with said second wireless access point, assigning said wireless client device to the same said VLAN to which said first wireless access point assigned said wireless client device;
in which assigning, with said first wireless access point, said wireless client device to one of a plurality of VLANs comprises:
performing a hashing function on a physical address of said wireless client device to determine which VLAN in the plurality of VLANs to assign the wireless client device to; and
in which assigning, with said second wireless access point, said wireless device to the same said VLAN comprises:
performing the same said hashing function on said physical address of said wireless client device to identify the same said VLAN that said wireless client device was previously assigned to, such that said wireless client device transitions from said first wireless access point to said second wireless access point without requiring said second access point to be aware of any previous assignment made to said wireless client device.

9. The method of claim 8, further comprising storing an indication of said VLAN to which said wireless client device is assigned in a location accessible to all said wireless access points in said system of interconnected wireless access points.

10. The method of claim 9, further comprising said second wireless access point retrieving said indication of said VLAN to which said wireless client device is assigned in response to said wireless client device connecting to said second wireless access point.

11. The method of claim 8, in which assigning said wireless client device to said one of said plurality of VLANs implemented within said network according to said protocol for balancing network load across said plurality of VLANs comprises:
determining a physical address associated with said wireless client device; and
performing a hashing function on said physical address to obtain an identity of said one of said plurality of VLANs.

12. The method of claim 11, in which said hashing function, when performed by said second wireless access point on said physical address, provides said second wireless access point with an identity of the VLAN to which said first wireless access point assigned said wireless client device.

13. The method of claim 8, in which assigning said wireless client device to said one of said plurality of VLANs implemented within said network according to said protocol for balancing network load across said plurality of VLANs comprises:
establishing a sequence for assigning wireless client devices to said plurality of VLANs implemented within said network; and
assigning said wireless client device to a said VLAN corresponding to a position of said wireless client device within said sequence.

14. The method of claim 8, in which assigning said wireless client device to said one of said plurality of VLANs implemented within said network according to said protocol for balancing network load across said plurality of VLANs comprises:
determining which VLAN in said plurality of VLANs has the least amount of network traffic; and
assigning said wireless client device to said VLAN having said least amount of network traffic.

15. A wireless access point, comprising:
a processor communicatively coupled to a memory; said memory storing executable code which, when executed by said processor, causes said processor to:
authenticate a wireless client device;
identify a network to which said wireless client device is assigned;
connect to said wireless client device to said network;
determine whether said wireless client device has been assigned to one of a plurality of Virtual Local Area Networks (VLANs) implemented within said network by a previous wireless access point in said network;
if said wireless client device has not been assigned to one of said plurality of VLANs by a previous wireless access point, assigning said wireless client device to one of said VLANs according to a protocol for balancing network traffic across said plurality of VLANs; and
if said wireless client device has been assigned to one of said plurality of VLANS by a previous wireless access point, assigning said wireless client device to said one of said VLANs to which said wireless client device was previously assigned:
in which assigning said wireless client device to said one of said plurality of VLANs according to said protocol for balancing network load across said plurality of VLANs comprises:
determining a physical address associated with said wireless client device; and
performing a hashing function on said physical address to obtain an identity of said one of said plurality of VLANs;
in which performing said hashing function on said physical address results in the same VLAN assignment each time said hashing function is applied, such that said wireless client device transitions from a first wireless access point to a second wireless access point without said second access point acquiring any previous assignment information of said wireless client device to said first wireless access point.

16. The wireless access point of claim 15, said executable code causes said processor to assigning said wireless client device to said one of said plurality of VLANs according to said protocol for balancing network traffic across said plurality of VLANs by:
determining a physical address associated with said wireless client device; and
performing a hashing function on said physical address to obtain an identity of said one of said plurality of VLANs.

17. The wireless access point of claim 15, said executable code causes said processor to assigning said wireless client device to said one of said plurality of VLANs according to said protocol for balancing network traffic across said plurality of VLANs by:
- establishing a sequence for assigning wireless client devices to said plurality of VLANs implemented within said network; and
- assigning said wireless client device to a said VLAN corresponding to a position of said wireless client device within said sequence.

* * * * *

UNITED STATES PATENT AND TRADEMARK OFFICE
CERTIFICATE OF CORRECTION

PATENT NO. : 8,730,811 B2
APPLICATION NO. : 13/081766
DATED : May 20, 2014
INVENTOR(S) : Le Sage et al.

Page 1 of 1

It is certified that error appears in the above-identified patent and that said Letters Patent is hereby corrected as shown below:

In the Claims

Column 10, line 37, Claim 15, delete "VLANS" and insert -- VLANs --, therefor.

Signed and Sealed this
Nineteenth Day of August, 2014

Michelle K. Lee
*Deputy Director of the United States Patent and Trademark Office*